United States Patent
Grob et al.

(10) Patent No.: US 9,178,632 B2
(45) Date of Patent: Nov. 3, 2015

(54) METHODS AND APPARATUS FOR AN ENHANCED MEDIA CONTENT RATING SYSTEM

(75) Inventors: Matthew S. Grob, San Diego, CA (US); Baaziz Achour, San Diego, CA (US); Brian K. Butler, San Diego, CA (US); Peter Carson, San Diego, CA (US); Sanjay K. Jha, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 278 days.

(21) Appl. No.: 12/203,087

(22) Filed: Sep. 2, 2008
(Under 37 CFR 1.47)

(65) Prior Publication Data
US 2010/0058377 A1    Mar. 4, 2010

(51) Int. Cl.
*H04H 60/31* (2008.01)
*H04H 60/46* (2008.01)
*H04N 21/258* (2011.01)
*H04N 21/442* (2011.01)
*H04N 21/658* (2011.01)
*H04N 21/845* (2011.01)
(Continued)

(52) U.S. Cl.
CPC ............... *H04H 60/31* (2013.01); *H04H 60/46* (2013.01); *H04N 21/25891* (2013.01); *H04N 21/44204* (2013.01); *H04N 21/44222* (2013.01); *H04N 21/6582* (2013.01); *H04N 21/8456* (2013.01); *H04H 60/64* (2013.01); *H04H 60/66* (2013.01)

(58) Field of Classification Search
CPC .................... H04N 21/25891; H04N 7/44204; H04N 21/44222; H04N 21/6582; H04H 60/31; H04H 60/46

USPC ............. 725/9, 13, 24, 32, 34, 35, 44–46, 50, 725/105, 135
See application file for complete search history.

(56) References Cited

U.S. PATENT DOCUMENTS 4,962,457 A   10/1990   Chen et al.
5,381,133 A    1/1995   Erhart et al.
(Continued)

FOREIGN PATENT DOCUMENTS

CN   101146058 A   3/2008
CN   101212646 A   7/2008
(Continued)

OTHER PUBLICATIONS

EpochTimes.com, "NCC coordination no. longer publish one minute television ratings", Website:http://www.epochtimes.com/b5/7/4/11/n1675333.htm, Apr. 11, 2007.
(Continued)

*Primary Examiner* — Hai V Tran
(74) *Attorney, Agent, or Firm* — Stanton Braden

(57) ABSTRACT

Methods, apparatus, systems and computer program products are provided for an improved media content rating system. The rating system herein disclosed is highly-granular in nature, in that, the rating system allows for ratings to be based on the number of times that portions, segments, clips of the media file are played or otherwise executed, as opposed to basing the media content rating solely on the number of times that the media file is played. In this regard, the aspects herein described may further provide for ratings of the portions, segments, clips of the media content as opposed to limiting the rating to a rating for the overall media content file.

46 Claims, 7 Drawing Sheets

(51) Int. Cl.
*H04H 60/64* (2008.01)
*H04H 60/66* (2008.01)

(56) References Cited

U.S. PATENT DOCUMENTS

| | | | |
|---|---|---|---|
| 5,493,291 A | 2/1996 | Bruggemann | |
| 5,799,256 A | 8/1998 | Pombo et al. | |
| 6,879,810 B2 | 4/2005 | Bouet | |
| 6,879,838 B2 | 4/2005 | Rankin et al. | |
| 6,898,432 B1 | 5/2005 | Jiang | |
| 6,990,635 B2* | 1/2006 | Kurapati et al. | 725/37 |
| 6,996,393 B2 | 2/2006 | Pyhalammi et al. | |
| 7,010,298 B2 | 3/2006 | Seedman et al. | |
| 7,096,100 B2 | 8/2006 | Arata | |
| 7,155,405 B2 | 12/2006 | Petrovich | |
| 7,250,860 B2 | 7/2007 | Smith et al. | |
| 7,302,465 B2 | 11/2007 | Ayres et al. | |
| 7,565,676 B2 | 7/2009 | Bell | |
| 7,653,341 B2* | 1/2010 | Bucher et al. | 455/2.01 |
| 7,840,693 B2 | 11/2010 | Gupta et al. | |
| 7,840,986 B2* | 11/2010 | Ali et al. | 725/105 |
| 7,937,725 B1 | 5/2011 | Schaffer et al. | |
| 8,126,477 B2 | 2/2012 | Dravida et al. | |
| 8,135,395 B2 | 3/2012 | Cassett et al. | |
| 2002/0035699 A1 | 3/2002 | Crosbie | |
| 2002/0062361 A1 | 5/2002 | Kivipuro et al. | |
| 2002/0076051 A1 | 6/2002 | Nii | |
| 2002/0120925 A1* | 8/2002 | Logan | 725/9 |
| 2002/0198958 A1 | 12/2002 | Frenkiel et al. | |
| 2003/0035434 A1 | 2/2003 | Le et al. | |
| 2003/0065712 A1 | 4/2003 | Cheung et al. | |
| 2003/0187984 A1 | 10/2003 | Banavar et al. | |
| 2003/0228842 A1 | 12/2003 | Heinonen et al. | |
| 2004/0015984 A1 | 1/2004 | Yamamoto et al. | |
| 2004/0128324 A1 | 7/2004 | Sheynman et al. | |
| 2004/0128343 A1 | 7/2004 | Mayer | |
| 2004/0248557 A1 | 12/2004 | Muratsu | |
| 2004/0249768 A1 | 12/2004 | Kontio et al. | |
| 2005/0177853 A1 | 8/2005 | Williams et al. | |
| 2005/0260973 A1 | 11/2005 | van de Groenendaal | |
| 2006/0008256 A1 | 1/2006 | Khedouri et al. | |
| 2006/0015580 A1 | 1/2006 | Gabriel et al. | |
| 2006/0031163 A1 | 2/2006 | Kivipuro et al. | |
| 2006/0056336 A1 | 3/2006 | Dacosta | |
| 2006/0073810 A1 | 4/2006 | Pyhalammi et al. | |
| 2006/0095582 A1 | 5/2006 | Nitya et al. | |
| 2006/0126556 A1 | 6/2006 | Jiang et al. | |
| 2006/0129855 A1 | 6/2006 | Rhoten et al. | |
| 2006/0135179 A1 | 6/2006 | Aaltonen | |
| 2006/0156209 A1 | 7/2006 | Matsuura et al. | |
| 2006/0173972 A1 | 8/2006 | Jung et al. | |
| 2006/0218604 A1 | 9/2006 | Riedl et al. | |
| 2006/0224517 A1 | 10/2006 | Shimpi et al. | |
| 2006/0242267 A1 | 10/2006 | Grossman | |
| 2006/0259580 A1 | 11/2006 | Laberteaux et al. | |
| 2006/0265280 A1 | 11/2006 | Nakada et al. | |
| 2006/0277028 A1 | 12/2006 | Chen et al. | |
| 2007/0016654 A1 | 1/2007 | Bowles et al. | |
| 2007/0021110 A1 | 1/2007 | Chaudhri et al. | |
| 2007/0055862 A1 | 3/2007 | Sharma et al. | |
| 2007/0061863 A1 | 3/2007 | Rajasekaran | |
| 2007/0091872 A1 | 4/2007 | Bergenwall | |
| 2007/0094691 A1 | 4/2007 | Gazdzinski | |
| 2007/0112676 A1 | 5/2007 | Kontio et al. | |
| 2007/0135060 A1 | 6/2007 | Roskind et al. | |
| 2007/0138268 A1 | 6/2007 | Tuchman | |
| 2007/0143370 A1 | 6/2007 | Bushmitch et al. | |
| 2007/0168354 A1 | 7/2007 | Ramer et al. | |
| 2007/0174467 A1 | 7/2007 | Ballou et al. | |
| 2007/0174471 A1 | 7/2007 | Van Rossum | |
| 2007/0178830 A1 | 8/2007 | Janik et al. | |
| 2007/0214182 A1 | 9/2007 | Rosenberg | |
| 2007/0228162 A1 | 10/2007 | Phillips | |
| 2007/0237101 A1 | 10/2007 | Cohen et al. | |
| 2007/0239537 A1 | 10/2007 | Protheroe et al. | |
| 2007/0239724 A1 | 10/2007 | Ramer et al. |
| 2007/0260635 A1 | 11/2007 | Ramer et al. |
| 2007/0286100 A1 | 12/2007 | Saaranen et al. |
| 2008/0005130 A1 | 1/2008 | Logan et al. |
| 2008/0005336 A1 | 1/2008 | Cohen et al. |
| 2008/0009268 A1 | 1/2008 | Ramer et al. |
| 2008/0016201 A1 | 1/2008 | Thompson |
| 2008/0034393 A1 | 2/2008 | Crayford |
| 2008/0034394 A1 | 2/2008 | Jacobs et al. |
| 2008/0037438 A1 | 2/2008 | Twiss et al. |
| 2008/0039058 A1 | 2/2008 | Ray |
| 2008/0103975 A1 | 5/2008 | Taratino et al. |
| 2008/0195546 A1 | 8/2008 | Lilley |
| 2008/0216145 A1 | 9/2008 | Barton et al. |
| 2008/0235351 A1 | 9/2008 | Banga et al. |
| 2008/0250120 A1 | 10/2008 | Mick et al. |
| 2008/0291855 A1 | 11/2008 | Bata et al. |
| 2009/0012873 A1 | 1/2009 | Hamling et al. |
| 2009/0052992 A1 | 2/2009 | Thompson et al. |
| 2009/0089188 A1 | 4/2009 | Ku et al. |
| 2009/0282050 A1 | 11/2009 | Thomas et al. |
| 2010/0057563 A1 | 3/2010 | Rauber et al. |
| 2010/0057924 A1 | 3/2010 | Rauber et al. |

FOREIGN PATENT DOCUMENTS

| | | |
|---|---|---|
| CN | 101253734 A | 8/2008 |
| EP | 1944914 | 7/2008 |
| JP | 2000076801 A | 3/2000 |
| JP | 2000350165 A | 12/2000 |
| JP | 2002171511 A | 6/2002 |
| JP | 2003030087 A | 1/2003 |
| JP | 2003134436 A | 5/2003 |
| JP | 2003162599 A | 6/2003 |
| JP | 2003224829 A | 8/2003 |
| JP | 2004072403 A | 3/2004 |
| JP | 2004297605 A | 10/2004 |
| JP | 2005110016 A | 4/2005 |
| JP | 2005275740 A | 10/2005 |
| JP | 2006041761 | 2/2006 |
| JP | 2006510270 A | 3/2006 |
| JP | 2006229444 A | 8/2006 |
| JP | 2006260275 A | 9/2006 |
| JP | 2007058688 A | 3/2007 |
| JP | 2007221715 A | 8/2007 |
| JP | 2007329972 A | 12/2007 |
| JP | 2008053824 A | 3/2008 |
| JP | 2008092526 A | 4/2008 |
| JP | 2008118410 A | 5/2008 |
| JP | 2008166979 A | 7/2008 |
| JP | 2008176669 | 7/2008 |
| JP | 2011526104 A | 9/2011 |
| KR | 20000025953 A | 5/2000 |
| KR | 102002008424 | 11/2002 |
| KR | 1020030024151 | 3/2003 |
| KR | 20030094361 A | 12/2003 |
| KR | 20040037490 A | 5/2004 |
| KR | 20040053381 A | 6/2004 |
| KR | 20040097242 A | 11/2004 |
| KR | 20060025286 A | 3/2006 |
| TW | 200635375 | 10/2006 |
| WO | WO-0124027 A1 | 4/2001 |
| WO | 0180031 A1 | 10/2001 |
| WO | 2004054264 A1 | 6/2004 |
| WO | WO-2005107258 A1 | 11/2005 |
| WO | WO2006098037 A1 | 9/2006 |
| WO | WO2007041597 A2 | 4/2007 |
| WO | WO2008033182 A1 | 3/2008 |
| WO | 2008041291 A1 | 4/2008 |
| WO | WO2008054802 | 5/2008 |
| WO | WO 2008054802 A2 * | 5/2008 |
| WO | WO-2008090859 A1 | 7/2008 |

OTHER PUBLICATIONS

Taiwan Search Report—TW098128703—TIPO—Feb. 19, 2014.
Tanimoto H., et al., "TV Viewing Interval Estimation for Personal Preference Acquisition", 2006 IEEE International Conference on Multimedia and Expo, pp. 889 to 892, Jul. 9 to 12, 2006.

(56) References Cited

OTHER PUBLICATIONS

Gibbon D C et al: "The Miracle video search engine" Consumer Communications and Networking Conference, 2006. CCNC 2006. 2006 3rd IEEE Las Vegas, NV, USA Jan. 8-10, 2006, vol. 1, Jan. 8, 2006, pp. 277-281, XP010893215.

Plagemann T et al: "From content distribution networks to content networks—issues and challenges" Computer Communications, Elsevier Science Publishers BV, Amsterdam, NL, vol. 29, No. 5, Mar. 6, 2006, pp. 551-562, XP025089783 ISSN: 0140-3664 [retrieved on Mar. 6, 2006] the whole document.

* cited by examiner

METHODS AND APPARATUS FOR AN ENHANCED MEDIA CONTENT RATING SYSTEM

CROSS REFERENCE TO CO-PENDING PATENT APPLICATIONS

The present application for patent is related to the following co-pending United States patent applications:

"Access Point for Improved Content Delivery System" by Rauber, et al., having U.S. Ser. No. 12/203096, filed concurrently herewith, assigned to the same assignee hereof, and expressly incorporated by reference as if set forth fully herein; and "Deployment and Distribution Model for Improved Content Delivery System" by Rauber, et al., having U.S. Ser. No. 12/203099, filed concurrently herewith, assigned to the same assignee hereof, and expressly incorporated by reference as if set forth fully herein.

BACKGROUND

1. Field

The described aspects relate to media content, and more particularly, to apparatus, methods and systems for an improved media content rating system.

2. Background

Communication devices, and more specifically wireless communication devices, such as cellular telephones, have rapidly gained in popularity over the past decade. These devices are rapidly becoming multifaceted devices capable of providing a wide-range of functions. For example, a cellular telephone may also embody computing capabilities, Internet access, electronic mail, text messaging, GPS mapping, digital photographic capability, an audio/MP3 player, video gaming capabilities and the like.

In addition, wireless communication devices are increasingly being manufactured with the ability to receive media content, such as audio content, video content, multimedia content or the like. As such, the communication devices may be configured to receive one-to-many transmissions, such as broadcast transmissions and/or multicast transmissions and/or one-to-one transmissions, such as unicast transmissions or the like. An example of a current multicast system is the MediaFLO™ system available from Qualcomm Incorporated of San Diego, Calif. The MediaFLO™ system utilizes orthogonal frequency division multiplexing (OFDM)-air interface based technology designed specifically for multi-casting a significant volume of rich multimedia content cost effectively to wireless device subscribers.

Additionally, as memory capacity on wireless communication devices continues to increase the ability to store a larger volume of media content on the wireless communication device becomes apparent. In this regard, when the wireless device possesses the capability to store numerous media content files, the user of such a device can enjoy the experience of repeatedly playing, listening or otherwise executing a favorite or preferred media content file while the file is stored and accessible on the device. For example, an 80 GigaByte (GB) device can store approximately 10,000 song files, approximately 50 full-length movies or a combination thereof. Such large storage volumes allow the user to accumulate a library of media content.

Various entities may benefit from knowing what media content a user of wireless device is playing or otherwise executing and, equally important, a user's preference for a particular media content file (i.e., how much a user enjoys a media content file or how they rate the media content file). For example, network operators, content providers, recording labels, motion picture studios and the like may benefit from such information. This information provides the entity with insight into the popularity of specific media content and the repeatability in terms of frequency of playing/executing. In turn, the entities can rely such information to provide future marketing strategies, media content pricing and the like.

Currently systems are deployed for rating media content, however, the systems are limited and do not necessarily provide the entities of interest the degree of information that they desire. In certain known systems, the user is relied upon to input ratings for media content. For example, a user can record a rating or score for a particular media content file based on their subjective preference for the media content file. This type of system requires the user to take an action beyond just playing or executing the media content in order for a rating to be recorded. Such a system does not provide for comprehensive ratings because a user will typically only provide ratings to a mere portion of the media content files that are played or otherwise executed. Thus, any rating results that are subsequently communicated to network entities, such as service providers, network operators or the like do not provide an accurate picture of the overall user's preference for the media content.

Other rating systems rely solely on the number of times that a media content file is played or otherwise executed as a means of gauging the user's preference for the media content. However, this type of rating system is also plagued with inaccuracies. In most instances, these types of rating systems will log a "play" each time a media content file is launched, regardless of whether the file is played in its entirety. Thus, if the user is experiencing technical difficulties in executing the file, causing numerous re-launches, the rating system will inaccurately inflate the user preference for this file. In the same regard, if a user does not view a video file, such as a movie, in its entirety during a single play but rather views the entire video file over numerous plays (e.g., the user watches a movie in fifteen minute segments), the rating system will inaccurately inflate the user preference for this file.

Conversely, if the rating system is configured to record a "play" only if the media content is played in its entirety, the rating system will not account for instances in which the user desires to only play a portion of a media content file (e.g., the user desires to only watch a certain scene in a movie or listen to a certain portion of a song.) and therefore, the rating system will inaccurately deflate the user preference for this file. Additionally, such rating systems only provide for a rating of the overall media content file and do not provide the ability to rate portions of the media file. Thus, in the above example in which the user only desires to play a portion of the media content, the rating system can not differentiate between a preference to play or otherwise execute the media content in its entirety versus playing or otherwise executing only a portion of the media file.

Therefore a need exists to develop methods, apparatus, systems and computer program products that provide for an improved media content rating system. The desired content rating system should be automated, such that ratings can be provided without any additional user input beyond selecting an executing the media content. Additionally, the desired media content rating system should provide for a higher level of granularity than current media content rating systems, thereby increasing the accuracy of the rating system. By providing for a rating system with a greater degree of accounting and higher level of accuracy, network entities, such as service providers, content providers and the like, can more readily rely on the rating information for marketing, sales and/or advertising purposes.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatus, systems and computer program products are provided for an improved media content rating system. The rating system herein disclosed is highly-granular in nature, in that, the rating system allows for ratings to be based on the number of times that portions, segments, clips of the media file are played or otherwise executed, as opposed to basing the rating solely on the number of times that the media file is played. In this regard, the aspects herein described may further provide for ratings of the portions, segments, clips of the media content as opposed to just providing a rating for the overall media content file. The finely detailed level of rating that may be provided by the aspects described is highly desired by content providers and network operators who can then in turn better assess future marketing, sales and/or advertising needs based on the precise level of content rating provided by the present aspects. Additionally, by basing the rating system on the number of times that portions of media files are played, the rating system is automated and does not involve user inputs beyond launching the media content.

In one aspect, a method for rating media content on a wireless communication device is defined. The method includes playing a selected media content on the wireless communication device, logging an amount of the playing of one or more portions of the media content and rating the media content based on the logged amount of the playing of each portion.

The method may further include providing rating metrics that are associated with the rating of the media content. The rating metrics may estimate a user preference for playing the selected media content. In turn, the method may further include providing the rating metrics on an output mechanism, such as display, associated with the wireless communication device, communicating the rating metrics to a network entity, such as a content provider, service provider or the like and/or communicating the rating metrics to user selected social networking group or the like. Communicating the rating metrics may be configured to occur automatically or may be based on user preference. Based on communicating the rating metrics to the network entity or user selected social networking group, the method may further include receiving media content recommendations that are based on the rating metrics and/or receiving advertisements that are selected based on the rating metrics.

In other aspects of the method rating the media content may further comprise rating the one or more portions of the media content based on the logged amount of the playing of each portion. In such aspects, the method may further include providing rating metrics that are associated with the rating of each portion of the media content. The rating metrics estimate a user preference for playing the one or more portions of the media content.

Alternate aspects of the method may include logging a time between playbacks of the media content, logging an amount of sharing/recommending the media content to other media content users, logging the amount of transferring the media content to other communication device and the like and using this additional logged information as a basis for rating the media content.

A further aspect is provided for by at least one processor configured to rate media content on a wireless communication device. The processor includes a first module for playing a selected media content on the wireless communication device and a second module for logging an amount of the playing of one or more portions of the media content. The processor additionally includes a third module for rating the media content based on the logged amount of the playing of each portion.

A computer program product that includes a computer-readable medium defines another relayed aspect. The medium includes at least one instruction for causing a computer to play a selected media content on the wireless communication device and at least one instruction for causing the computer to log an amount of the playing of one or more portions of the media content. The medium further includes at least one instruction for causing the computer to rate the media content based on the logged amount of the playing of each portion.

Yet another related aspect is provided for an apparatus. The apparatus includes means for playing a selected media content on the wireless communication device and means for logging an amount of the playing of one or more portions of the media content. The apparatus additionally includes means for rating the media content based on the logged amount of the playing of each portion.

A wireless communication device defines yet another aspect. The device includes a computer platform including at least one processor and a memory in communication with the processor. The device also includes a media content player stored in the memory and in communication with the processor. The media content player is operable to play selected media content. Additionally, the device includes a media content ratings module stored in the memory and in communication with the processor. The media content ratings module is operable to log an amount of the playing of one or more portions of selected media content and rate the media content based on the logged amount of the playing of each portion.

In optional aspects of the wireless communication device the media content ratings module is further operable to provide rating metrics that are associated with the rating of the media content. The ratings metrics estimate a user preference for playing the selected media content. The wireless device may further include a ratings metrics presentation module stored in the memory and in communication with the processor. The rating metrics presentation module is operable to present the rating metrics on an output mechanism associated with the wireless communication device.

Further, the wireless communication device may include a communication module operable to communicate the rating metrics to at least one of network entity or a user selected group of media content users. The ratings metrics may be configured to be communicated to the network entity or group of media content users automatically or based on user-defined preference. In response to communicating the ratings metrics, the wireless communication device may include a media content recommendation module operable to receive to receive content recommendations based on communicating the rating metrics to the network entity or the user selected group of media content users and/or an advertising module operable to receive advertising for presentation on the wireless communication device based on communicating the rating metrics to the network entity. The advertising is selected for the wireless communication device based on the rating metrics.

In other alternate aspects of the wireless communication device, the media content ratings module may be further operable to rate the one or more portions of the media content based on the logged amount of the playing of each portion. In such aspects, the media content rating module may be further operable to provide rating metrics that are associated with the rating of the one or more portions of the media content.

Alternate aspects of the wireless communication device may provide for the media content rating module to log a time between playbacks of the media content, log an amount of sharing/recommending the media content to other media content users, log the amount of transferring the media content to other communication device and/or the like and use this additional logged information as a basis for rating the media content.

A method for managing media content ratings metrics at a network entity, such as a network operator, content provider, content source or like, provides another aspect. The method includes receiving media content ratings metrics from a wireless communication device. The ratings metrics rate media content based on the amount of playing of one or more portions of the media content on the wireless communication device. The method further includes performing a media content ratings-related task based on the received media content rating metrics.

In one aspect of the method performing the media content ratings related task may include providing information to the wireless communication device based on the media content ratings metrics. In such aspects, the information provided may be media content recommendations based on the media content ratings metrics, advertising selected based on the media content ratings metrics or the like. In other aspects performing the media content ratings related task may include determining advertisement rates for products or services in the media content based on the media content ratings metrics.

In other optional aspects of the method receiving media content ratings metrics may further include receiving the media content ratings metrics, in which the ratings metrics rate portions of the media content based on the amount of playing of one or more portions of the media content on the wireless device. Additionally, in other aspects of the method, receiving media content ratings metrics may further include receiving the media content ratings metrics, in which the ratings metrics rate the media content on at least one of time between playbacks, an amount of sharing the media content with other users, or an amount of transferring the media content to other devices.

At least one processor configured to manage media content ratings metrics at a network entity defines a related aspect. The processor includes a first module for receiving media content ratings metrics from a wireless communication device. The ratings metrics rate media content based on the amount of playing of one or more portions of the media content on the wireless communication device. The processor additionally includes a second module for performing a media content ratings-related task based on the received media content rating metrics.

A computer program product that includes a computer-readable medium provides yet another related aspect. The medium includes at least one instruction for causing a computer to receive media content ratings metrics from a wireless communication device. The ratings metrics rate media content based on the amount of playing of one or more portions of the media content on the wireless communication device. The medium additionally includes at least one instruction for causing the computer to perform a media content ratings-related task based on the received media content rating metrics.

A further aspect is provided for by an apparatus that includes means for receiving media content ratings metrics from a wireless communication device. The ratings metrics rate media content based on the amount of playing of one or more portions of the media content on the wireless communication device. The apparatus additionally includes means for performing a media content ratings-related task based on the received media content rating metrics.

A network apparatus provides for yet another aspect. The network apparatus includes a computer platform including at least one processor and a memory in communication with the processor. The apparatus also includes a media content ratings metric module stored in the memory and in communication with the processor. The media content ratings metric module is operable to receive media content ratings metrics from a wireless communication device. The ratings metrics rate media content based on the amount of playing of one or more portions of the media content on the wireless communication device. The apparatus also includes a media content ratings manager module stored in the memory and in communication with the processor. The media content ratings manager module is operable to perform a task based on the received media content rating metrics.

According to optional aspects of the network apparatus the media content ratings manager module is further operable to provide information to the wireless communication device based on the media content ratings metrics. The information may include, but is not limited to, media content recommendations based on the media content ratings metrics, advertising to the wireless communication device based on the media content ratings metrics. In other aspects, the media content ratings manager may be further operable to determine advertisement rates for products or services in the media content based on the media content ratings metrics.

According to further alternate options of the network apparatus, the media content ratings metric module may be further operable to receive the media content ratings metrics, in which the ratings metrics rate portions of the media content based on the amount of playing of one or more portions of the media content on the wireless communication device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

Figure 1:
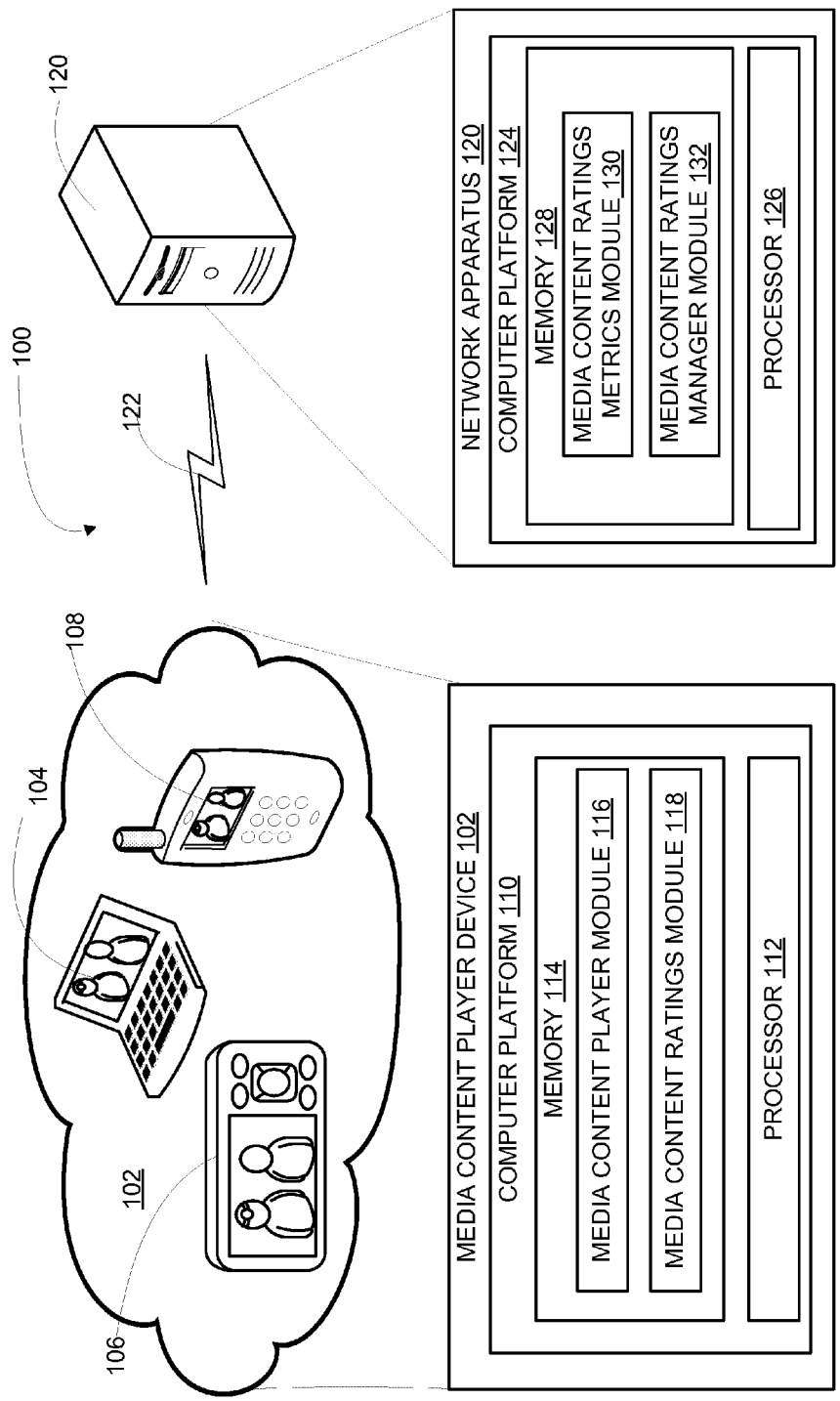
FIG. 1 is a schematic and block diagram illustration of a system for enhanced media content rating, in accordance with an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component or module may be, but is not limited to being, a process running on a processor, a processor, an object, an executable, a thread of execution, a program, and/or a computer. By way of illustration, both an application running on a computing device and the computing device can be a component or module. One or more components or modules can reside within a process and/or thread of execution and a component may be localized on one computer and/or distributed between two or more computers. In addition, these components or modules can execute from various computer readable media having various data structures stored thereon. The components or modules may communicate by way of local and/or remote processes such as in accordance with a signal having one or more data packets, such as data from one component interacting with another component or module in a local system, distributed system, and/or across a network such as the Internet with other systems by way of the signal.

Furthermore, various aspects are described herein in connection with a wireless communication device. A wireless communication device can also be called a system, device, subscriber unit, subscriber station, mobile station, mobile, mobile device, remote station, remote terminal, access terminal, user terminal, terminal, communication device, user agent, user device, or user equipment (UE). Further, a wireless communication device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The aspects herein described provide for an enhanced media content rating system. The rating system herein disclosed is highly granular in nature, in that, the rating system allows for ratings to be based on portions, segments, clips of the media content file as opposed to the entire media content file. In this regard, the rating system provides for rating of a scene in a movie, a level of game, a chapter of a book, a song within a compact disc (CD), a segment within a song or the like. The resulting rating may be a rating for the media content file or individual ratings for each portion, segment, clip, scene, chapter or the like of the media content file. In turn, the highly-granular rating system may be used by content providers, network providers and the like to better gauge precisely what content user is playing, viewing, listening to or the like. This information can be used by the content providers, network providers and the like to assess future marketing, sales and/or advertising needs for the content user as well as the overall market.

Additionally, by basing the rating system use statistics, such the amount of times that a media content file is played, viewed, or otherwise interacted with, the rating system is automated and transparent to the device user. The device user does not have to provide any user inputs beyond launching the media content and providing any other inputs to sustain the playing of the media content.

With reference to FIG. 1, a schematic and block diagram is provided of a system for enhanced media content rating is provided, in accordance with an aspect. The system 100 comprises media content player devices 102, such as laptop computer 104, portable media player device 106, cellular telephone 108 or the like. While the media content player devices 102 shown in FIG. 1 are generally wireless media content players, the devices may also be non-wireless in nature, such as personal computers or the like that have a wired connection to a network.

The media content player devices 102 include a computing platform 110 having at least one processor 112 and a memory 114 in communication with the processor 112. The memory 114 includes a media content player module 116 operable to play selected media content. For example, the selected media content may include, but is not limited to, video content, such as movies, television programs and the like, audio content, such as CDs, songs, voice programs and the like, gaming content, such as video games, multimedia content, interactive content, data/text content and the like.

The memory 114 additionally includes a media content rating module 118 that is operable to log an amount of playing, viewing, listening, or otherwise executing of one or more portions of selected media content and rate the media content overall or each of the portions of the media content based on the logged amount of the playing of each portion. As defined herein, a "portion" is any segment of the media content less than the entire media content. For example, a portion may be, but is not limited to, a scene in a movie, a level of game, a chapter of a book, a song within a compact disc (CD), a segment within a song or the like.

The system additionally includes a network apparatus 120 that is in network communication 122 with the media content player device 102. In the illustrated example of FIG. 1 the network connection is a wireless network connection, although as previously discussed the network connection may be a wired connection. The network apparatus 120 may include one or more network devices, such as servers or the like and multiple network devices may be centrally located or located at different physical locations within the constructs of the communication network.

The network apparatus 120 includes a computer platform 124 having at least one processor 126 and a memory 128 in communication with the processor 126. The memory includes a media content ratings metric module 130 operable to receive media content ratings metrics from the media content players 102. The media content ratings metrics are ratings of the collection of media content stored or played on the wireless device that indicate the user's preference for playing or executing the media content. Additionally, the ratings are based on the amount of playing or executing of one or more portions of the media content on the media content player. The ratings may reflect a rating for the overall media content file, such as a rating for a video, movie, CD, song, book, game or the like and/or the rating may reflect a rating for each portion of the media content file, such as a rating for a video segment, a movie scene, a song within a CD, a segment of a song, a chapter of a book, a level of a game or the like.

The memory 128 of network apparatus 120 additionally includes a media content ratings manager module 132 that is operable to perform a task based on the receipt of the media content ratings metrics. The task may be, but is not limited to, providing media content recommendations or media content to the media content players based on the media content ratings metrics, providing advertisements to the media content players based on the media content ratings metrics, determining advertisement rates for products or services in the media content based on the media content ratings metrics and the like.

Figure 2:
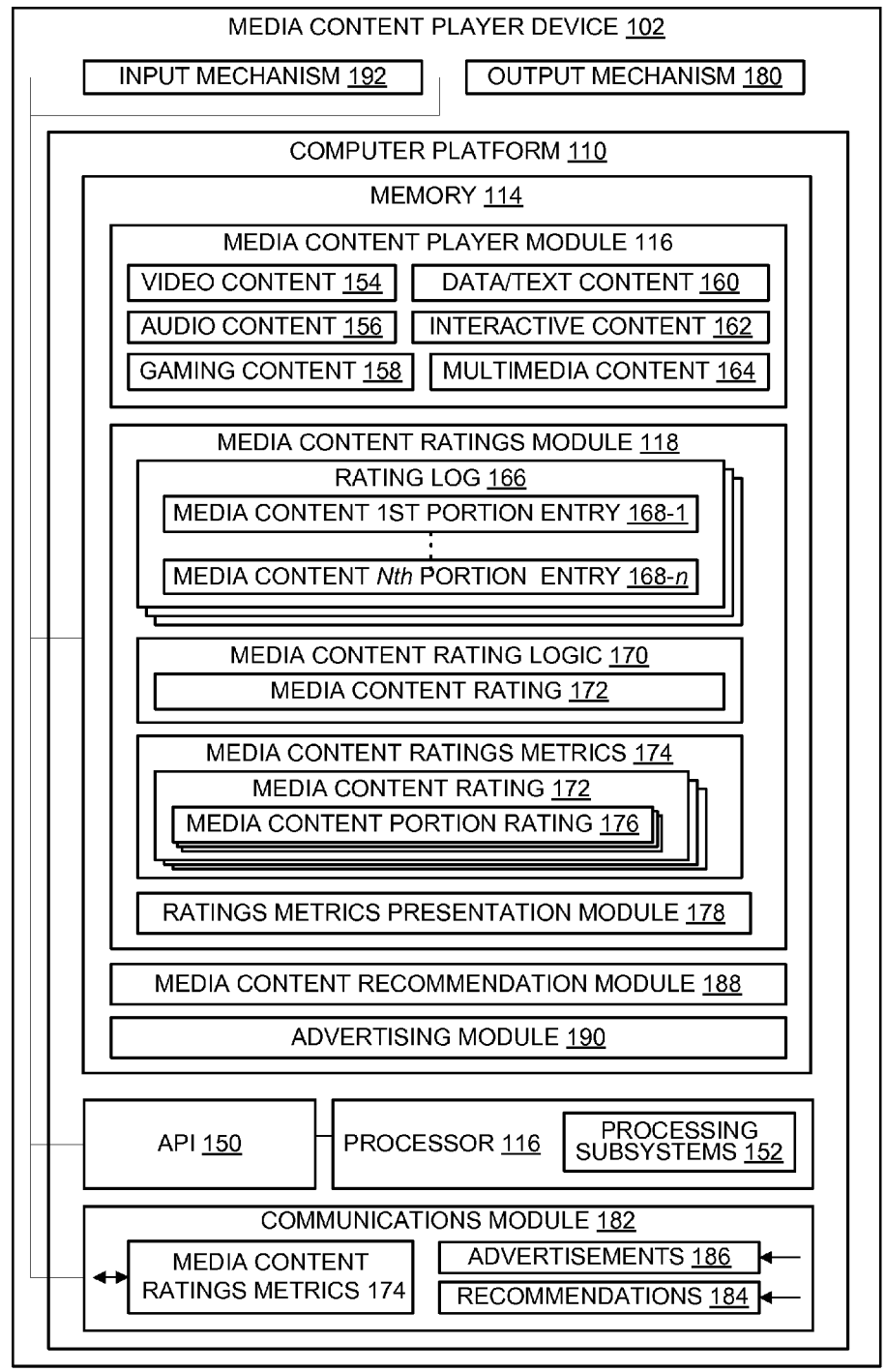
FIG. 2 is a block diagram of a media content player device configured for enhanced media content rating, according to another aspect.

Referring to FIG. 2 a detailed block diagram of a media content player device 102 is shown, in accordance with aspects. The media content player device 102 may include any type of computerized, communication device, such as cellular telephone, The media content player device 102 may be a wireless communication device, such as any type of computerized, wireless device, for example a cellular telephone, a Personal Digital Assistant (PDA), a portable media player, a portable computer, and even a separate computer platform that has a wireless communications portal, and which also may have a wired connection to a network or the Internet. The wireless device can be a remote-slave, or other device that does not have an end-user thereof but simply communicates data across a wireless or wired network, such as remote sensors, diagnostic tools, data relays, and the like. In alternate aspects, the media content player device 102 may be a wired communication device, such as a personal computer, set-top box, gaming console or the like. The apparatus and method for enhanced media content rating can accordingly be performed on any form of wired or wireless device or computer module, including a wired or wireless communication portal, including without limitation, wireless modems, PCMCIA cards, access terminals, personal computers, telephones, or any combination or sub-combination thereof.

The media content player device 102 includes computer platform 110 that can transmit data across a wireless network, and that can receive and execute routines and applications.

Computer platform 110 includes memory 114, which may comprise volatile and nonvolatile memory such as read-only and/or random-access memory (RAM and ROM), EPROM, EEPROM, flash cards, or any memory common to computer platforms. Further, memory 114 may include one or more flash memory cells, or may be any secondary or tertiary storage device, such as magnetic media, optical media, tape, or soft or hard disk.

Further, computer platform 110 also includes processor 112, which may be an application-specific integrated circuit ("ASIC"), or other chipset, processor, logic circuit, or other data processing device. Processor 112 or other processor such as ASIC may execute an application programming interface ("API") layer 150 that interfaces with any resident programs, such as media content player module 116 and media content ratings module 118 stored in the memory 114 of media content player device 102. API 150 is typically a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on media content players.

Processor 112 includes various processing subsystems 152 embodied in hardware, firmware, software, and combinations thereof, that enable the functionality of media content player device 102 and the operability of the media content player device 102 on communications network 122. For example, processing subsystems 152 may allow for initiating and maintaining communications, and exchanging data, with other networked devices. In aspects in which the media content player device is part of a cellular telephone the communications processor 112 may additionally include one or a combination of processing subsystems 152, such as: sound, nonvolatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 2 for the sake of clarity).

For the disclosed aspects, processing subsystems 152 of processor 112 may include any subsystem components that interact with the media content player module 116 and/or the media content ratings module 118. For example, processing subsystems 152 may include clock devices/applications that are implemented in conjunction with ratings logs 166. Alternatively, one or more of the operations generally included in processing subsystems 152 may exist, in place of or in conjunctively, as modules/applications and/or logic stored in memory 114.

The memory 114 of media content player device 102 includes a media content player module 116 operable to play selected media content. For example, the selected media content may include, but is not limited to, video content 154, such as movies, television programs and the like, audio content 156, such as CDs, songs, voice programs and the like, gaming content 158, such as video games, data/text content 160, interactive content 162, multimedia content 166 and any other media content (not shown in FIG. 2.) It should also be noted that media content player module 116 is not limited to commercial media content player modules, such as Windows Media Player, RealPlayer® or the like but is broadly defined to include any module capable of playing, executing or otherwise presenting media content on a media content player device.

The memory 114 of media content player devices 112 also includes a media content ratings module 118 that is operable to log the amount of playing, in terms of number of times and/or duration, of one or more portions of the media content. As previously noted the term "portion" as used herein refers to any segment of the media content less than the entire media content file. As such, media content ratings module 118 includes a rating log 166 for each of the media content stored on the device 102 or otherwise played on the device 102. The rating log 166 includes media content portion entries 168 that track the amount of playing of the associated media content portion. In the illustrated example shown in FIG. 2 the ratings log 166 includes a plurality of media content portion entries 168 including media content first portion entry 168-1 through media content nth portion entry 168-n, which signifies the last portion of the media content. For example, if the media content is a full-length motion picture, the rating log 166 for the motion picture may include a media content first portion entry 168-1 that reflects the amount of playing the first scene in the motion picture and additional portion entries 168 reflecting additional scenes in the motion portion, up through and including the media content nth portion entry 168-n, or last entry, which reflects the last scene in the motion picture.

Figure 3:
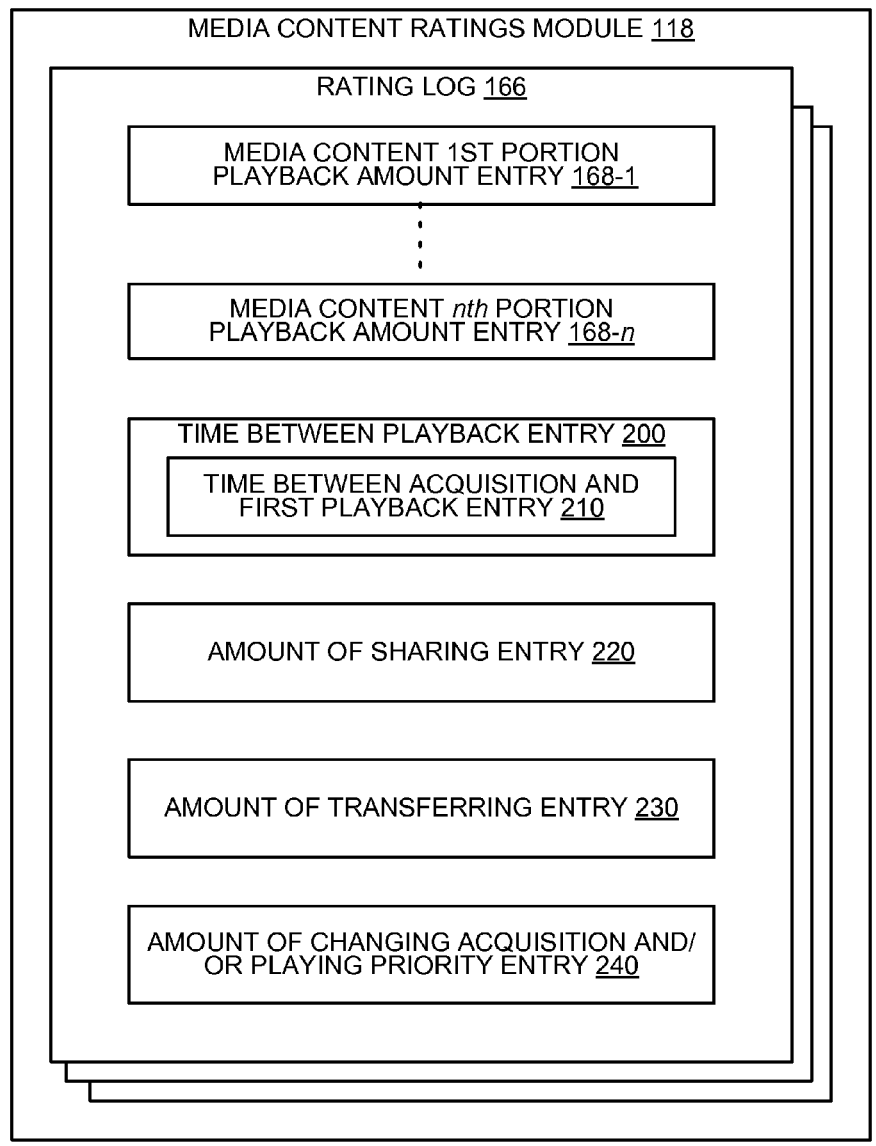
FIG. 3 is a block diagram of a media content ratings module highlighting examples of logged media content use indices, in accordance with an aspect.

In optional aspects, the rating log 166 may provide for tracking and logging other use indices of the media content. The tracking and logging of the other use indices may be used in conjunction with the playback amounts 168 of the one or more portions to determine a rating for media content and/or ratings for the individual portions. Referring to FIG. 3, additional optional use indices that may be tracked and logged include time between playback entry 200. Included within the time between playback entry 200 may be a time between acquisition and first playback entry 210, which indicates the time between when the content was acquired and when the content was first played or executed. The time between playback entry 200 provides another indication of the user's preference for the media content. In this regard, the time between playback entry 200 along with the playback amount entries 168 provide the ability to determine a rate of playing/executing the associated media content. The time between playback entry 200 may be configured to account for time between playback of each individual portion of the media content (i.e., separate entries for each portion) or the time between playback entry 200 may be configured to account for time between playback of any portion or the entire media content (i.e., one entry for the entire media content).

The rating log 166 of media content ratings module 118 may optionally provide for an amount of sharing entry 220 that indicates the number of times that the media content or a portion of the media content has been shared with other media content users. In certain instances, the media content may capable of being freely shared with other media content users, such as the case in instances in which the media content is not tied to licensing or copyright restrictions which restrict such sharing, while in other instances a portion, commonly referred to as a sample, of the media file may be shared with other media content users. The sharing entry 220 may further be used by the ratings module 116, along with the amount of playback entries 168 to determine a user's preference for particular media content.

Additionally, the rating log 166 of media content ratings module 118 may optionally include an amount of transferring entry 230 that indicates the number of times that the media content or a portion of the media content has been transferred to another device. In certain instances, the media content may capable of being freely transferred to other devices in the possession of the media content player user, such as the case in instances in which the media content is not tied to licensing or copyright restrictions, which restrict such transfer. For example, a user may acquire a motion picture on a wireless device, such as a portable media player, cellular telephone or the like and subsequently desire to transfer the motion picture to a set top box with memory, in order to subsequently play the movie on a conventional television/video monitor. The amount transferring entry 230 may further be used by the ratings module 116, along with the amount of playback entries 168 to determine a user's preference for particular media content.

In other aspects, the rating log 166 of media content ratings module 118 may optionally include an amount of changing acquisition or playback priority entry 240. In certain media content acquisition systems, such as the system described in relation to FIG. 5 and described infra., the user may create and maintain a priority list for acquiring media content. Storage limitations may prohibit the media content player device 102 from storing a large volume of certain media files, such as large memory video files. Additionally, Digital Rights Management (DRM) protocol may prohibit a media content player device 102 from storing more than a prescribed number of media content, in instances in which the content is leased or rented as opposed to be owned outright. In such aspects, the priority list provides an indication of the order in which media content items may be acquired. In other aspects, the user may create and maintain a playback priority list that provides the user with a listing of stored media content ordered in terms of the preference for playback immediacy. By changing the order of acquisition priority and/or playback priority, the user provides further indication as to their preference for playing/executing the media content. The amount of change of acquisition priority and/or playback priority entry 240 may further be used by the ratings module 116, along with the amount of playback entries 168 to determine a user's preference for particular media content.

Returning to FIG. 2, the media content ratings module 118 additionally includes media content ratings logic 170 operable to determine a media content rating 172 for each of media content and/or each of the portions of the media content. Media content ratings logic 170 determines media content rating 172 based on the amount of playing of the portions of the media content. Additionally, the media content rating 170 may determine the media content rating 172 based on other use indices, such as, but not limited to, time between playback, time between acquisition and playback, amount of sharing with other media content users, amount of transferring to other media content playing devices, amount of changing acquisition or playing priority or the like.

Media content ratings module 118 may include media content ratings metrics 174 which include a collection of the plurality of media content ratings 172 for each media content file/item that is stored, has been stored in the past and/or has been played or executed in the past on the media content player device 102. As previously noted each of the media content ratings 172 may include individual media content portion ratings 176 for each of the portions of the media content. The media content ratings metrics 174 may be presented on the media content player device 102 and/or they may be communicated to a network entity and/or they may be shared with other media player devices, such as shared with a social networking group.

As such, memory 114 of media content player device 102 may include a ratings metrics presentation module 178 operable for configuring the ratings metrics 174 in presentable format and presenting the ratings metrics 174 on an output mechanism 180, such as a media content player display or the like.

Additionally, the memory 114 of computer platform 110 includes communications module 182 operable for communicating the media content ratings metrics 174 to a network entity, such as a network operator, service provider or the like and/or other media content users, such as users in a social networking group or the like. Additionally, the communications 182 may be operable to receive media content ratings metrics 174 from other media content users' devices, such as users in a social networking group or the like. Communications module 182 embodied in hardware, firmware, software, and combinations thereof, enables communications among the various components of media content player device 102, as well as between the media content player device 102, and network apparatus and/or other media content player devices. As such, the communication module 182 may include the requisite hardware, firmware, software and/or combinations thereof for establishing a wireless communication connection. In addition to communicating the media content ratings to a network entity and/or other media content users, the communication module 182 may be operable to receive media content recommendations 184 and/or advertisements 186 based on communicating the media content ratings metrics 174 to the network entities and/or other media content users.

In this regard, the memory 114 of media content player device 102 may optionally include media content recommendation module that is operable to receive media content recommendations from a network entity, such as a network provider or content provider or the like, and/or from other media content users, such as users in a social networking group or the like. The media content recommendation being based on the media content rating metrics sent to either/or the network entity or the other media content users. In addition to receiving media content recommendations, the media content recommendation module may be operable to determine recommendations for other media content users and to communicate, via communications module 182, the recommendations to the other media content users/devices, such as users in a social networking group. In such instances, the recommendations may be based on the media content ratings metrics 174 communicated to the other media content users/devices and/or media content metrics 174 received from the other media content users/devices.

The memory 114 of media content player 102 may additionally optionally include an advertising module 190 operable for receiving advertisements 186 and/or advertisement recommendations, via communication module 182, from a network entity, such as an advertisement provider, network service provide, content provider or the like. In such aspects, the advertisements 186 and/or advertisement recommendations may be based on the media content ratings metrics 174 associated with media content player device 102. In the aspect in which the advertisement module 190 receives advertisements 186, the advertisement module 190 may be operable for presenting the advertisements in conjunction with playing or executing the media content on the media content player device 102 and/or in conjunction with any other application executing on the media content player device 102 that provides for advertisement insertion. In the aspect in which the advertisement module 190 receives advertisement recommendations, the advertisement module 190 may be operable to retrieve advertisements for a local database or from a network databases based on the advertisement recommendations and present the retrieved advertisements on the media content player device 102 in conjunction with the media content and/or other applications executing on the media content player device 102.

Additionally, as previously noted, media content player device 102 output mechanisms 180 for generating information for consumption by the user of the communication device. Additionally, media content player device 102 includes input mechanisms 192 for generating inputs into media content player device. For example, input mechanisms 192 may include a mechanism such as a key or keyboard, a mouse, a touch-screen display, a microphone, etc. In certain aspects, the input mechanisms 192 provide for user input to interface with media content to provide for playing the media content in its entirety or playing chosen portions of the media content. Further, for example, output mechanism 180 may include a display, an audio speaker, a haptic feedback mechanism, etc. In the illustrated aspects, the output mechanism 180 may include a display operable to display media content video and/or a speaker operable to output audio related to media content audio and the like.

Figure 4:
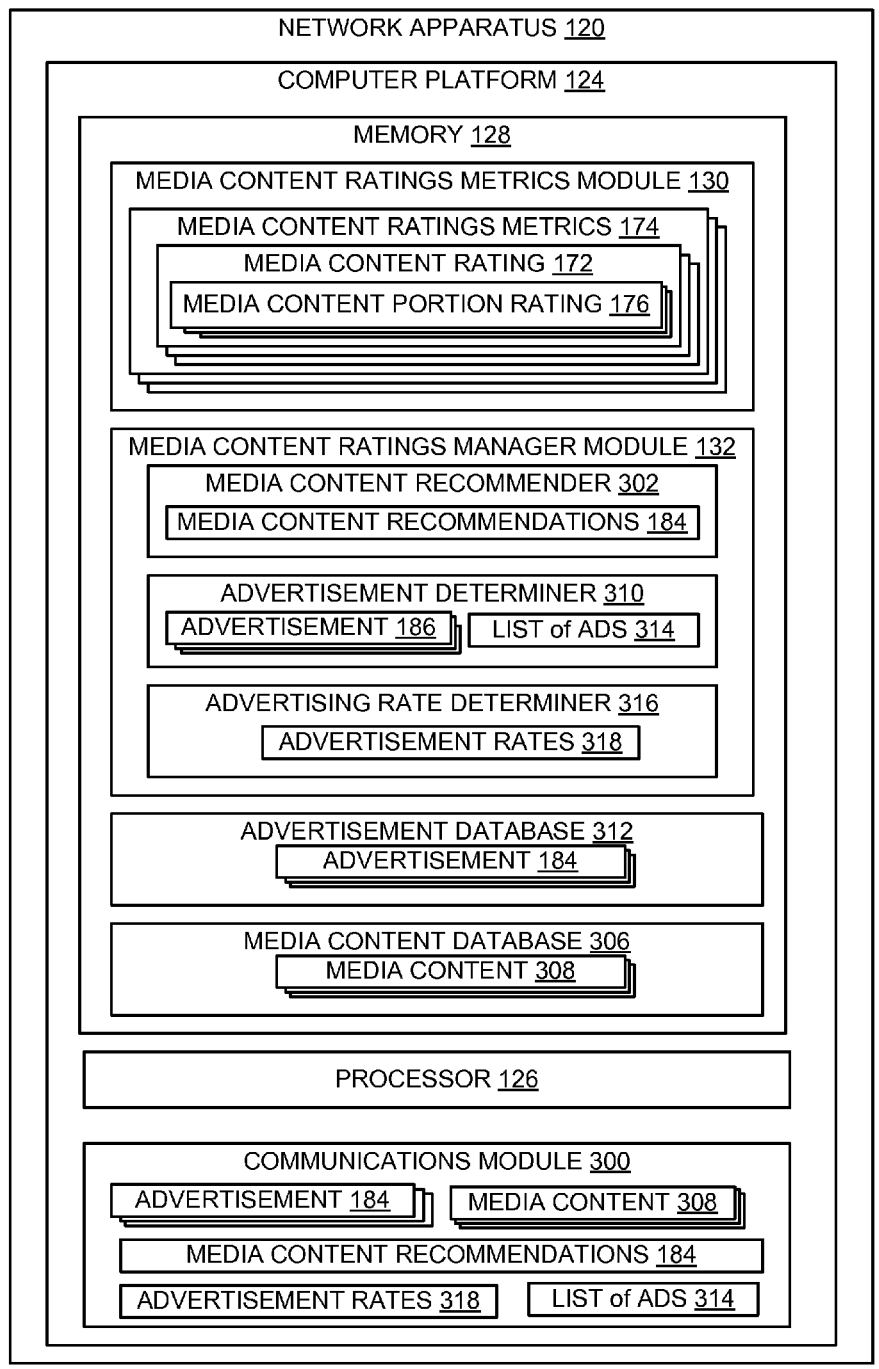
FIG. 4 is a block diagram of a network apparatus configured to receive media content ratings metrics and perform tasks based on the receipt of the metrics, according to yet another aspect.

Referring to FIG. 4 a block diagram is presented of a network apparatus 120, in accordance with present aspects. The network apparatus 120 is in network communication with the media content player device (not shown in FIG. 4). The network apparatus may comprise at least one of any type of hardware, server, personal computer, mini computer, mainframe computer, or any computing device either special purpose or general computing device. Further, the modules and applications described herein as being operated on or executed by the network apparatus 120 may be executed entirely on the network apparatus 120 or alternatively, in other aspects, separate servers or computer devices may work in concert to provide data in usable formats to parties, and/or to provide a separate layer of control in the data flow between the media content player device 102 and the modules and applications executed by network apparatus 120.

The network apparatus 120 includes computer platform 124 that can transmit and receive data across a wired or wireless network, and that can execute routines and applications. Computer platform 120 includes a memory 128, which may comprise volatile and nonvolatile memory such as read-only and/or random-access memory (RAM and ROM), EPROM, EEPROM, flash cards, or any memory common to computer platforms. Further, memory 120 may include one or more flash memory cells, or may be any secondary or tertiary storage device, such as magnetic media, optical media, tape, or soft or hard disk. Further, computer platform 124 also includes a processor 126, which may be an application-specific integrated circuit ("ASIC"), or other chipset, processor, logic circuit, or other data processing device. The computer platform 124 may further include a communications module 130 embodied in hardware, firmware, software, and combinations thereof, that enables communications among the various components of the network apparatus 120, as well as between the network apparatus 120 and media content player devices 102. The communication module may include the requisite hardware, firmware, software and/or combinations thereof for establishing a wireless communication connection.

The memory 128 of network apparatus 120 includes a media content ratings metric module 130 operable to receive, via communications module 300, media content ratings metrics 174 from the media content players 102. The media content ratings metrics 174 may include media content ratings 172 for an overall media content file, such as an entire motion picture or the like and the media content rating metrics may optionally include media content portion ratings 176 that indicate a rating a rating for a portion of the overall media content file, such as a scene in a motion picture or the like. Thus, media content ratings metrics 172 are ratings of the collection of media content and/or portions of the media content stored or played on the media content player device. As previously noted the media content ratings indicate the user's preference for playing or executing the media content and/or a portion of the media content. Additionally, the ratings are based on the amount of playing or executing of one or more portions of the media content on the media content player and optionally other use indices, such as the time between playback, the amount of transfer to other media content player devices, the amount the sharing with other media content users, the amount of changing acquisition/playing priority and the like.

The memory 128 of network apparatus 120 additionally includes a media content ratings manager module 132 that is operable to perform a task based on the receipt of the media content ratings metrics 174. As such, the media content ratings manager 132 may optionally include a media content recommender 302 operable to determine media content recommendations 184 for user's of media content player devices based on the media content ratings metrics associated with the user. Media content recommender 302 may determine media content recommendations 184 and communicate, via communication module 300, the recommendations 184 back to the associated media content player device. Alternatively, the media content recommender 302 may be configured to communicate media content or a portion of the media content (i.e., a sample of the media content) to the associated media content player device based on the recommendations. A sample of the media content may be communicated in conjunction with the media content recommendations to further entice the user into purchasing or otherwise acquiring the media content. In such aspects, the media content recommender 302 may access the media content database 306 to retrieve the recommended media content 308 or a sample of the recommended media content.

Additionally, the media content ratings manager 132 may include an advertisement determiner 310 operable to determine advertisements 186 targeted for user's of media content player devices based on the media content ratings metrics associated with the user. Advertisement determiner 310 may be configured to determine advertisements 186, retrieve the advertisements for an advertisement database 312 and communicate advertisements 186 to the media content player devices via communication module 300. In alternate aspects, the advertiser determiner 310 may determine advertisements and communicate, via the communication module 300, the determined list of advertisements 314 to the media content player device, which, in turn, retrieves the advertisements from a local database or a network database.

The media content ratings manager 132 may additionally optionally include an advertisement rate determiner 316 that is operable to determine advertising rates for products or services that are included in the media content based on the media content metrics for the particular media content or media content portion that the service or product is included within. For example, many motion pictures have name brand named products used throughout the motion picture, which provide for the motion picture maker to charge an advertisement fee/rate to the manufacturer of the product based on the placement of the product in the motion picture. Based on media content rating metrics, which indicate a users preference for playing a selected media content, the motion picture provider or the like can gauge the amount of playing of the media content or, more specifically, the amount of playing of the specific portion of the media content that includes the brand name product. In turn, the motion picture provider or the like can charge the manufacturer an advertisement rate that is commiserate with the amount of times that the media content or the specific portion of media content is being played or otherwise executed. By basing the advertisement rate off of the amount of playing the media content or the specific portion of media content as opposed to a flat rate or a rate based on the acquisition amount, the content provider benefits from pricing advertising based on actual viewing of the product (i.e., advertisement impressions) and the product manufacturer only pays for advertising based on actual viewing of the product. The advertisement rates 318 may subsequently be communicated, via communication module 300, to the product or service providers associated with the advertised service or product.

Figure 5:
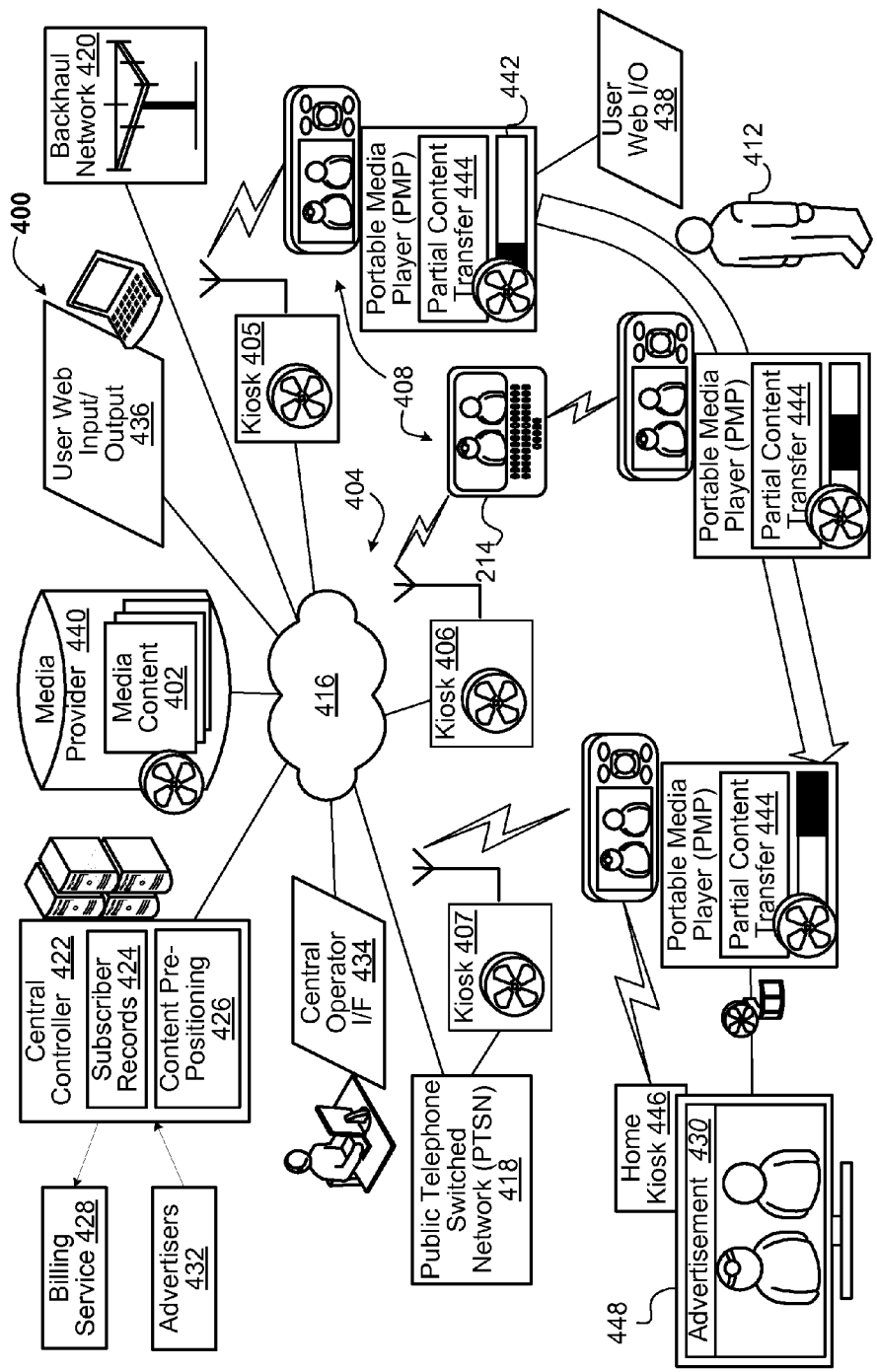
FIG. 5 is a schematic diagram of an exemplary system for delivering media content to media content player device, in accordance with another aspect.

With reference to FIG. 5, a content delivery system 400 improves upon delivery of media content 402 over a communication network 404 by utilizing a plurality of strategically placed vendor kiosks 405, 406, 407 that have an economic incentive to service a plurality of wireless-capable portable devices 408. It should be noted that the system 400 shown in FIG. 5 is by way of example only and that media content can be delivered or otherwise acquired by media content player devices in other manners and via other systems. As such, the delivery or acquisition of media content may occur over a wireless connection, a wired connection or directly to the media content player device via incorporated or connected device such as DVD, CD player or the like.

It should be appreciated that in system 400 of FIG. 5 the media content players are described as portable devices 408, while in other systems the media content players may non-portable devices, such as PCs or the like. Portable devices 408 may comprise a number of types handheld or carried apparatus with a unitary or distributed construction that perform a more dedicated function (e.g., solely media player) or are a converged device having media player as one function (e.g., smart phone). In the illustrative depiction, a population of wireless-capable portable devices 408, including a converged handheld computer 414, are depicted as including a personal media player (PMP) 410 carried by a user 412.

The communication network 404 can provide communication channels of varying data throughput, interoperability and coverage areas. For example, portions of the communication network 404 can comprise a public or private Internet 416, public telephone switched network (PSTN) 418, and/or an over-the-air broadcast carrier (e.g., unicast, multicast, one-way, two-way, WiMax, cellular telephone, etc.), depicted as a backhaul network 420 for media content distribution purposes. In the exemplary depiction, the communication channel via the PTSN 418 to vendor kiosk 407 is a very economical, albeit slow, for downloading large media files and provides an opportunity for prepositioning popular catalog selections well in advance of a user 412 being in proximity.

A network controller 422 manages the content delivery system 400 by maintaining a subscriber record data structure 424 and content pre-positioning tracking data structure 426 that is reflected in updated catalogs. The central controller 422 relays billing and credits to a billing service 428 and receives advertisements 430 from advertisers 432 for merging or coupling in some instances with delivered media content 402. A central operator interface (I/F) 434 can provide human interaction/configuration of central controller 422, operator assistance via the PTSN 418 with users 412, or facilitating a user web input/output (I/O) service 436 for subscribing or for receiving selections. Web-enabled portable devices 408, such as depicted at 438, can access this web I/O 434 directly. Media providers 440 that provide access to the media content 402 can facilitate data rights management (DRM) for end user access and use limitations on the media content 402.

In an illustrative use case, the PMP 410 enters a coverage area of the kiosk 406, resulting in receiving a first portion of a selection or, depending on the size of the selection or the time located in the coverage area, the entire selection, which can include user indication as depicted at 442. In the instance in which only a portion of the selection is received, upon leaving the coverage area or shutdown of the PMP 410, a partial content transfer module 444 verifies the integrity of the partial transfer, prepares a report to the network for the next opportunity to upload, and in some instances formats the partial transfer for playback. Subsequently, the PMP 410 forms an ad hoc network with another subscribing portable device 414 that is able to transfer another portion of the selection previously downloaded or relayed from kiosk 406. Subsequently, the PMP 410 completes the download from kiosk 407, which can be the same device as a home kiosk 446 that archives or supplements the downloaded selection from the PMP 410. The home kiosk 446 (e.g., a set-top box, home computer, dedicated device, etc.) or the PMP 410, in some aspects, can then stream or download the media content for playback on a full-size display monitor 448.

Figure 6:
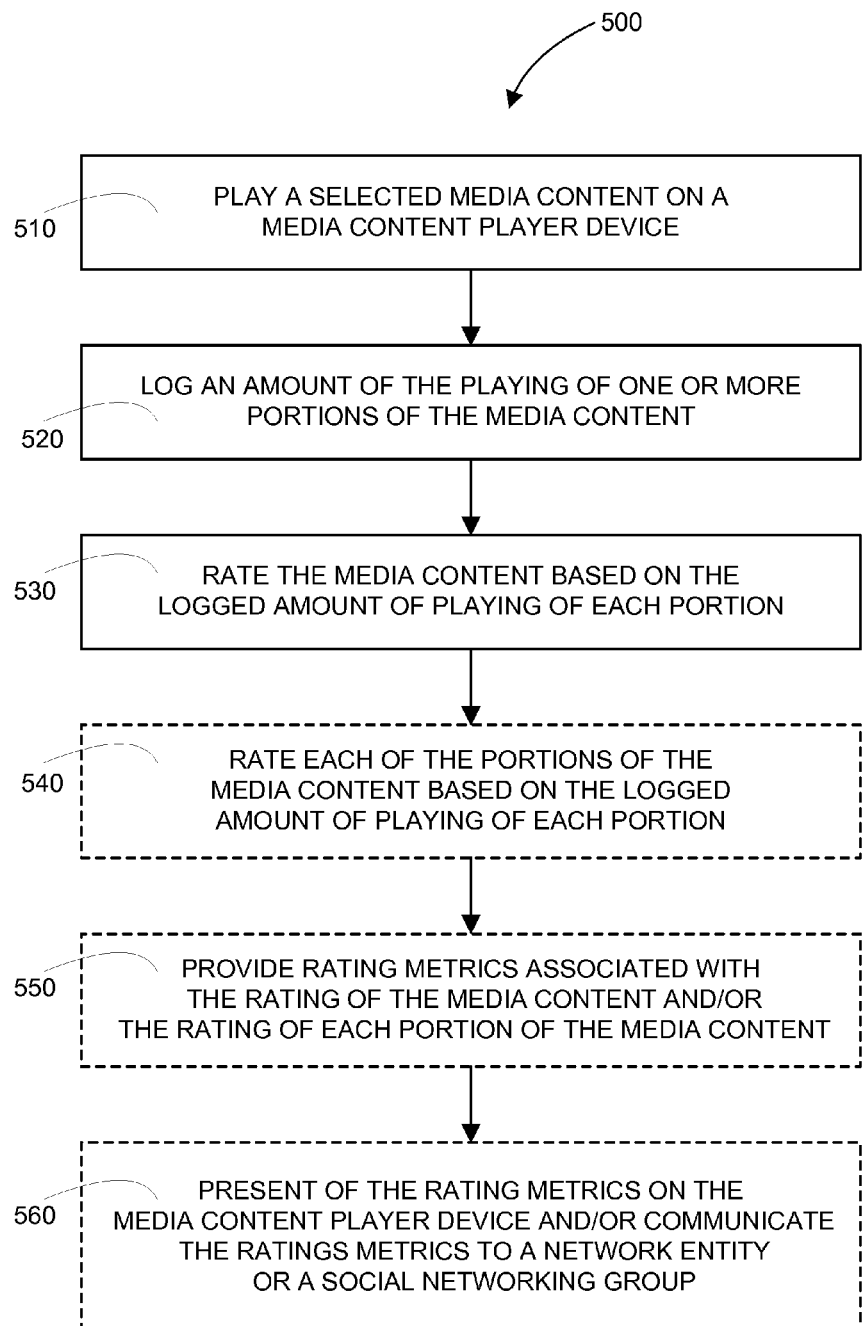
FIG. 6 is flow diagram of a method for providing enhanced media content rating on media content player device, according to yet another aspect.

Referring to FIG. 6 a flow diagram of a method 500 for enhanced media content rating is provided, according to an aspect. At Event 510, a selected media content is played or otherwise executed on a media content player device. The media content may include video media content, audio media content, multimedia media content, gaming media content, interactive media content, data/text media content and the like. The media content may be played or executed in its entirety or only a selected portion or selected portions of the media content may be played. As previously noted, the media content player may comprise any device suitable for playing media content, including wireless devices and wired devices.

At Event 520, the amount of the playing of one or more portions of the media content are logged. Logging of the playing of the portions provides for the number of times that a selected portion has been played or the length of time that a portion has played. As previously noted, a portion is herein defined as any segment less than the entire media content file. As such, a portion may include, a clip or scene in video or multimedia file, a single photo in a picture file, a song or song segment in a music file, a chapter in an audio file, a chapter in a book/text file, a level in a gaming file or the like. A user may select to play only one designated portion of media content or the user may play the entire media content file. In either instance the method provides for logging the portions that have been played or executed. For example, if the user selects to play or otherwise execute a single portion, the single portion is logged and if the user plays or otherwise executes the entire media content, all of the portions that comprise the media content are logged.

At Event 530, the media content is rated based on the logged amount of playing of each portion. In this regard, the overall media content is rated based the user's preference for playing or otherwise executing portions of the media content. In one aspect, a higher rating may be assigned if the user plays or otherwise executes the media content in its entirety versus only playing a portion of media content. In other aspects, a higher rating may be assigned if the user plays or repeatedly plays a larger portion or more portions versus playing or repeatedly playing a smaller portion or less portions. The rating of the media content may be based solely on the amount of playing of the portions or it may be based on additional use indices, such as time between playback, amount of transfer to other media player devices, amount of sharing with other media content users and the like.

At optional Event 540, each portion of the media content is individually rated based on the logged amount of playing of each portion. In such aspects, the method is able to provide a user preference for each portion of the media content in addition to or in lieu of a rating for the overall media content. By providing a media content rating for each portion of the media content, network providers, content providers and the like are able to gain a better understanding of which portions of the media content the user is actually playing or executing as opposed to just providing a rating of the media content in total. The rating of the portions of media content may be based solely on the amount of playing of the portions or it may be based on additional use indices, such as time between playback of the portions, amount of transfer of the portions to other media player devices, amount of sharing of the portions with other media content users and the like.

At optional Event 550, media content ratings metrics are provided. The media content ratings metrics comprise the media content ratings for each media content and/or portions of the media content item/file associated with the media content player. In this regard, the metrics may include ratings for media content currently stored on the device, currently accessible to the device, previously played or stored but not currently stored on the device or accessible to the device and the like. Regardless of whether additional use indices, beyond the amount of playing portions of media content, are used to determine media content ratings, the additional use indices, such as playback of the portions, amount of transfer of the portions to other media player devices, amount of sharing of the portions with other media content users and the like, may comprise the media content ratings metrics.

At optional Event 560, the media content ratings metrics are presented on the media content player device and/or communicated to a network entity, such as a content provider, service provider or the like and/or communicated to other media content users, such as a social networking group or the like. In response to communicating the media content ratings metrics to the network entity and/or the other media content users, the media content player device may receive media content and/or media content recommendations that are based on the media content ratings metrics. Additionally, in response to communicating the media content ratings metrics to the network entity, the media content player device may receive targeted advertisements or a targeted advertisement list that are based on the media content ratings metrics.

Figure 7:
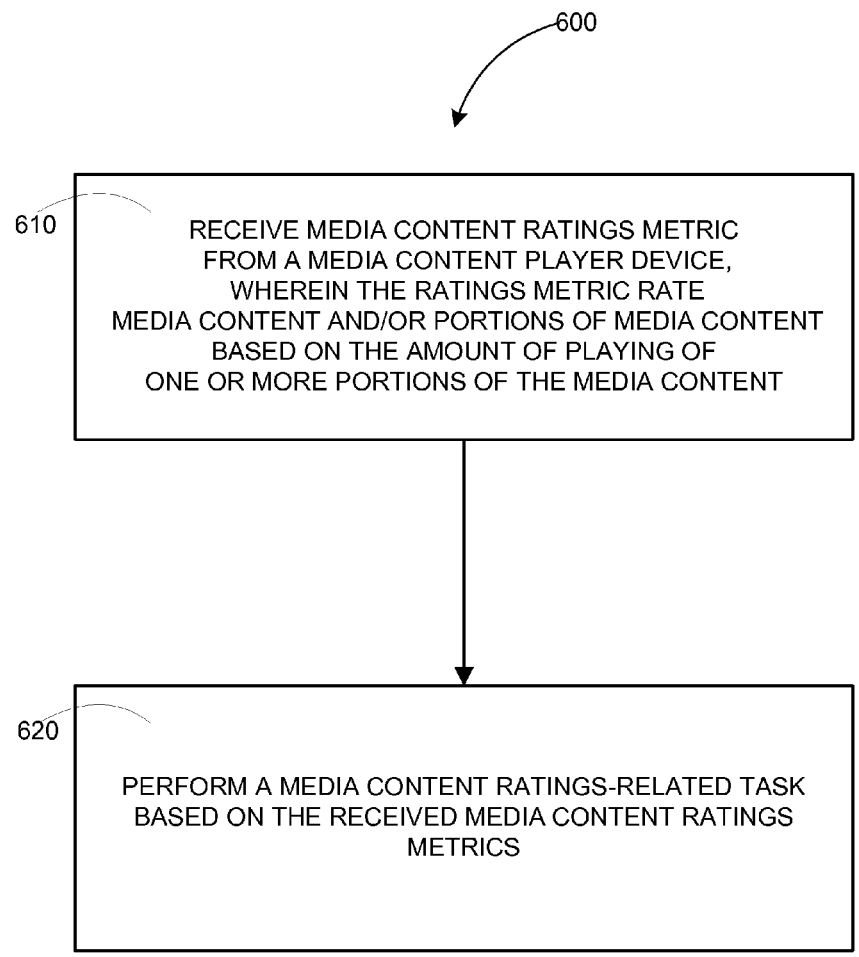
FIG. 7 is a flow diagram of a method for managing media content ratings at a network entity, according to a further aspect.

Referring to FIG. 7 a flow diagram is presented for a method 600 of managing media content ratings metrics at a network entity, according to another aspect. At Event 610, the network entity, such as a content provider, service provider or the like, receives media content rating metrics from a media content player device. The ratings metrics rate media content and, in optional aspects, portions of the media content, based on the amount of playing of one or more portions of the media content. Additionally, the media content ratings included in the metrics may rate the content or portions of the content on other use indices, such as playback of the portions, amount of transfer of the portions to other media player devices, amount of sharing of the portions with other media content users and the like. Or alternately, the other use indices, such as playback of the portions, amount of transfer of the portions to other media player devices, amount of sharing of the portions with other media content users and the like, may be included as separate indices within the content ratings metrics.

At Event 620, the network entity performs a media content ratings-related task based on receipt of the media content ratings metrics. In one aspect, the media content ratings-related task may comprise determining media content to recommend to the media content player device or user associated with the media content rating metrics based on the metrics. The network entity further communicates the media content recommendations, the media recommended media content and/or a sample of the recommended media content to the media content player device associated with the metrics. In another aspect, the media content ratings-related task may comprise determining targeted advertising for the media content player device or user associate with the metrics. The network entity further communicates the advertisements or a list of advertisements to the media content player device associated with the metrics. In yet another aspect, the media content ratings-related task may comprise determining advertising rates for products and/or services depicted in the media content based on the media content ratings metrics associated with the media content and/or portions of the media content.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Thus, methods, apparatus, systems and computer program products are defined for an improved media content rating system. The rating system described above is highly-granular in nature, in that, the rating system allows for ratings to be based on the number of times that portions, segments, clips of the media file are played or otherwise executed, as opposed to basing the rating solely on the number of times that the media file is played. In this regard, the aspects described may further provide for ratings of the portions, segments, clips of the media content as opposed to just providing a rating for the overall media content file. The finely detailed level of rating that may be provided by the aspects is highly desired by content providers and network operators who can then in turn better assess future marketing, sales and/or advertising needs based on the precise level of content rating provided by the present aspects. Additionally, by basing the rating system on the number of times that portions of media files are played, the rating system is automated and does not involve user inputs beyond launching the media content.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method for rating media content on a wireless communication device, comprising:
    playing a selected media content on the wireless communication device in response to user input;
    logging an amount of the playing of one or more portions of the selected media content automatically without other user input, including logging a time between playbacks of said one or more portions of the selected media content, each of the one or more portions comprising less than the entire selected media content;

creating, by a user, a prioritized list having an entry that corresponds to said selected media content and having further entries that respectively correspond to further media content;
changing, by a user, a priority rank of said entry in the prioritized list;
automatically, without other user input, rating the selected media content based on the logged amount of the playing of said one or more portions of the selected media content and further based on an amount of said changing said priority rank of said entry and on said time between playbacks of said one or more portions of the selected media content;
providing rating metrics associated with said rating of the selected media content automatically, without other user input; and
sending the rating metrics to a receiving entity via wireless electronic transmission;
wherein said time between playbacks is a time difference between a relatively earlier point in time corresponding to one said playback and a relatively later point in time corresponding to another said playback.

2. The method of claim 1, wherein the rating metrics estimate a user preference for playing the selected media content.

3. The method of claim 1, wherein rating the media content further comprises rating the one or more portions of the media content based on the logged amount of the playing of said one or more portions of the media content.

4. The method of claim 3, wherein the rating metrics are associated with the rating of the one or more portions of the media content.

5. The method of claim 4, wherein the rating metrics estimate a user preference for playing the one or more portions of the media content.

6. The method of claim 1, further comprising presenting the rating metrics on an output mechanism associated with the wireless communication device.

7. The method of claim 1, further comprising communicating the rating metrics to at least one of a network entity or a user selected group of media content users.

8. The method of claim 7, wherein communicating the rating metrics further comprises communicating the rating metrics based on a user selected preference.

9. The method of claim 7, further comprising receiving content recommendations based on communicating the rating metrics to the network entity or the user selected group of media content users.

10. The method of claim 7, further comprising receiving advertising for output presentation on the wireless communication device based on communicating the rating metrics to the network entity, wherein the advertising is selected for the wireless communication device based on the rating metrics.

11. The method of claim 1, wherein rating the media content comprises rating the media content based on said time between playbacks of said one or more portions of the media content.

12. The method of claim 1, further comprising logging an amount of sharing the media content with other media content users and rating the media content based on the amount of sharing the media content with other media content users.

13. The method of claim 1, further comprising logging an amount of transferring the media content to other communication devices and rating the media content based on the amount of transferring the media content to other communication devices.

14. At least one processor that rates media content on a wireless communication device, the processor comprising:

a first module for playing a selected media content on the wireless communication device in response to user input;
a second module for logging an amount of the playing of one or more portions of the selected media content automatically, without other user input, including logging a time between playbacks of said one or more portions of the selected media content, wherein each of the one or more portions comprises less than the entire selected media content, for creating, by user input, a prioritized list having an entry that corresponds to said selected media content and having further entries that respectively correspond to further media content, and for changing, by user input, a priority rank of said entry in the prioritized list; and
a third module for automatically, without other user input, rating the selected media content based on the logged amount of the playing of said one or more portions of the selected media content and further based on an amount of said changing said priority rank of said entry and on said time between playbacks of said one or more portions of the selected media content, and for providing rating metrics associated with said rating of the selected media content automatically, without other user input;
wherein said time between playbacks is a time difference between a relatively earlier point in time corresponding to one said playback and a relatively later point in time corresponding to another said playback.

15. A computer program product, comprising:
a non-transitory computer-readable medium having encoded thereon instructions that, when executed by a computer, cause the computer to:
play a selected media content on the wireless communication device in response to user input;
log an amount of the playing of one or more portions of the selected media content automatically, without other user input, including logging a time between playbacks of said one or more portions of the selected media content, each of the one or more portions comprising less than the entire selected media content;
create, by user input, a prioritized list having an entry that corresponds to said selected media content and having further entries that respectively correspond to further media content;
change, by user input, a priority rank of said entry in the prioritized list;
automatically, without other user input, a rating the selected media content based on the logged amount of the playing of said one or more portions of the selected media content and further based on an amount of said changing said priority rank of said entry and on said time between playbacks of said one or more portions of the selected media content; and
provide rating metrics associated with said rating of the selected media content automatically, without other user input;
wherein said time between playbacks is a time difference between a relatively earlier point in time corresponding to one said playback and a relatively later point in time corresponding to another said playback.

16. An apparatus, comprising:
means for playing a selected media content on a wireless communication device in response to user input;
means for logging an amount of the playing of one or more portions of the selected media content automatically, without other user input, including logging a time between playbacks of said one or more portions of the selected media content, each of the one or more portions comprising less than the entire selected media content;

means for creating, by user input, a prioritized list having an entry that corresponds to said selected media content and having further entries that respectively correspond to further media content, and for changing, by user input, a priority rank of said entry in the prioritized list; and means for automatically, without other user input, rating the selected media content based on the logged amount of the playing of said one or more portions of the selected media content and further based on an amount of said changing said priority rank of said entry and on said time between playbacks of said one or more portions of the selected media content, and for providing rating metrics associated with said rating of the selected media content automatically, without other user input;

wherein said time between playbacks is a time difference between a relatively earlier point in time corresponding to one said playback and a relatively later point in time corresponding to another said playback.

17. A wireless communication device, comprising:

a computer platform including at least one processor and a memory in communication with the processor;

a media content player stored in the memory and in communication with the processor, wherein the media content player is operable to play selected media content in response to user input; and a media content ratings module stored in the memory and in communication with the processor, wherein the media content ratings module is operable to log an amount of the playing of one or more portions of the selected media content automatically, without other user input, including to log a time between playbacks of said one or more portions of the selected media content, wherein each of the one or more portions comprises less than the entire selected media content, to create, by user input, a prioritized list having an entry that corresponds to said selected media content and having further entries that respectively correspond to further media content, to change, by user input, a priority rank of said entry in the prioritized list, to rate the selected media content automatically, without other user input, based on the logged amount of the playing of said one or more portions of the selected media content and on said time between playbacks of said one or more portions of the selected media content and further based on an amount of said changing said priority rank of said entry, and to provide rating metrics associated with said rating of the selected media content automatically, without other user input;

wherein said time between playbacks is a time difference between a relatively earlier point in time corresponding to one said playback and a relatively later point in time corresponding to another said playback.

18. The wireless communication device of claim 17, wherein the rating metrics estimate a user preference for playing the selected media content.

19. The wireless communication device of claim 17, wherein the media content ratings module is further operable to rate the one or more portions of the selected media content based on the logged amount of the playing of the one or more portions of the selected media content.

20. The wireless communication device of claim 19, wherein the rating metrics are associated with the rating of the one or more portions of the selected media content.

21. The wireless communication device of claim 17, further comprising a rating metrics presentation module stored in the memory and in communication with the processor, wherein the rating metrics presentation module is operable to present the rating metrics on an output mechanism associated with the wireless communication device.

22. The wireless communication device of claim 17, further comprising a communications module operable to communicate the rating metrics to at least one of a network entity or a user selected group of media content users.

23. The wireless communication device of claim 22 wherein the communications module is further operable to communicate the rating metrics based on a user selected preference.

24. The wireless communication device of claim 22, further comprising a media content recommendation module stored in the memory and in communication with the processor, wherein the media content recommendation module is operable to receive content recommendations based on communicating the rating metrics to the network entity or the user selected group of media content users.

25. The wireless communication device of claim 22, further comprising an advertising module stored in the memory and in communication with the processor, wherein the advertising module is operable to receive advertising for presentation on the wireless communication device based on communicating the rating metrics to the network entity, wherein the advertising is selected for the wireless communication device based on the rating metrics.

26. The wireless communication device of claim 17, wherein the media content ratings module is further operable to rate the selected media content based on the time between playbacks of said one or more portions of the selected media content.

27. The wireless communication device of claim 17, wherein the media content ratings module is further operable to log an amount of sharing said one or more portions of the selected media content with other media content users and rate the selected media content based on the amount of sharing said one or more portions of the selected media content with other media content users.

28. The wireless communication device of claim 17, wherein the media content ratings module is further operable to log an amount of transferring said one or more portions of the selected media content to other communication devices and rate the selected media content based on the amount of transferring said one or more portions of the selected media content to other communication devices.

29. A method for managing media content ratings metrics at a network entity, comprising:

receiving media content ratings metrics from a wireless communication device, wherein the ratings metrics rate media content based on an amount that one or more portions of the media content play on the wireless communication device in response to user input, wherein each of the one or more portions comprises less than the entire media content, wherein the ratings metrics rate the media content further based on an amount of changing a priority rank of an entry in a prioritized list, wherein said entry corresponds to the media content, wherein said prioritized list has further entries that respectively correspond to further media content, wherein said prioritized list is created by a user, wherein said priority rank of said entry is changed by a user, and wherein the ratings metrics are produced by the wireless communication device automatically, without other user input, and wherein the ratings metrics rate the media content further based on a time between playbacks of said one or more portions of the selected media content; and performing a media content ratings-related task based on the received media content rating metrics;
wherein said time between playbacks is a time difference between a relatively earlier point in time corresponding to one said playback and a relatively later point in time corresponding to another said playback.

30. The method of claim 29, performing a media content ratings-related task further comprises providing information to the wireless communication device based on the media content ratings metrics.

31. The method of claim 30, wherein providing information to the wireless communication device further comprises providing media content recommendations to the wireless communication device based on the media content ratings metrics.

32. The method of claim 30, wherein providing information to the wireless communication device further comprises providing advertising to the wireless communication device, wherein the advertising is selected based on the media content ratings metrics.

33. The method of claim 29, wherein the ratings metrics rate said one or more portions of the media content based on the amount of playing of said one or more portions of the media content on the wireless communication device.

34. The method of claim 29, wherein performing a media content ratings-related task further comprises determining advertisement rates for products or services in the media content based on the media content ratings metrics.

35. The method of claim 29, wherein the ratings metrics rate the media content based on at least one of an amount of sharing said one or more portions of the media content with other users, or an amount of transferring said one or more portions of the media content to other devices.

36. The method of claim 29, wherein the network entity includes one of a network operator, a content provider or a content source.

37. At least one processor that manages media content ratings metrics at a network entity, comprising:
a first module for receiving media content ratings metrics from a wireless communication device, wherein the ratings metrics rate media content based on an amount that one or more portions of the media content play on the wireless communication device in response to user input, wherein each of the one or more portions comprises less than the entire media content, wherein the ratings metrics rate the media content further based on a time between playbacks of said one or more portions of the media content, and further based on an amount of changing a priority rank of an entry in a prioritized list, wherein said entry corresponds to the media content, wherein said prioritized list has further entries that respectively correspond to further media content, wherein said prioritized list is created by a user, wherein said priority rank of said entry is changed by a user, and wherein the ratings metrics are produced by the wireless communication device automatically, without other user input; and
a second module for performing a media content ratings-related task based on the received media content ratings metrics;
wherein said time between playbacks is a time difference between a relatively earlier point in time corresponding to one said playback and a relatively later point in time corresponding to another said playback.

38. A computer program product, comprising:
a non-transitory computer-readable medium having encoded thereon instructions that, when executed by a computer, cause the computer to:
receive media content ratings metrics from a wireless communication device, wherein the ratings metrics rate media content based on an amount that one or more portions of the media content play on the wireless communication device in response to user input, wherein each of the one or more portions comprises less than the entire media content, wherein the ratings metrics rate the media content further based on a time between playbacks of said one or more portions of the media content, and further based on an amount of changing a priority rank of an entry in a prioritized list, wherein said entry corresponds to the media content, wherein said prioritized list has further entries that respectively correspond to further media content, wherein said prioritized list is created by a user, wherein said priority rank of said entry is changed by a user, and wherein the ratings metrics are produced by the wireless communication device automatically, without other user input; and
perform a media content ratings-related task based on the received media content ratings metrics;
wherein said time between playbacks is a time difference between a relatively earlier point in time corresponding to one said playback and a relatively later point in time corresponding to another said playback.

39. An apparatus, comprising:
means for receiving media content ratings metrics from a wireless communication device, wherein the ratings metrics rate media content based on an amount that one or more portions of the media content play on the wireless communication device in response to user input, wherein each of the one or more portions comprises less than the entire media content, wherein the ratings metrics rate the media content further based on a time between playbacks of said one or more portions of the media content, and further based on an amount of changing a priority rank of an entry in a prioritized list, wherein said entry corresponds to the media content, wherein said prioritized list has further entries that respectively correspond to further media content, wherein said prioritized list is created by a user, wherein said priority rank of said entry is changed by a user, and wherein the ratings metrics are produced by the wireless communication device automatically, without other user input; and
means for performing a media content ratings-related task based on the received media content ratings metrics;
wherein said time between playbacks is a time difference between a relatively earlier point in time corresponding to one said playback and a relatively later point in time corresponding to another said playback.

40. A network apparatus, comprising:
a computer platform including at least one processor and a memory in communication with the processor;
a media content ratings metric module stored in the memory and in communication with the processor, wherein the media content ratings metric module is operable to receive media content ratings metrics from a wireless communication device, wherein the ratings metrics rate media content based on an amount that one or more portions of the media content play on the wireless communication device in response to user input, wherein each of the one or more portions comprises less than the entire media content, wherein the ratings metrics rate the media content further based on a time between playbacks of said one or more portions of the media content, and further based on an amount of changing a priority rank of an entry in a prioritized list, wherein said entry corresponds to the media content, wherein said prioritized list has further entries that respectively correspond to further media content, wherein said prioritized list is created by a user, wherein said priority rank of said entry is changed by a user, and wherein the ratings metrics are produced by the wireless communication device automatically, without other user input; and a media content ratings manager module stored in the memory and in communication with the processor, wherein the media content ratings manager module is operable to perform a media content ratings-related task based on the received media content ratings metrics;

wherein said time between playbacks is a time difference between a relatively earlier point in time corresponding to one said playback and a relatively later point in time corresponding to another said playback.

41. The network apparatus of claim 40, wherein the media content ratings manager module is further operable to provide information to the wireless communication device based on the media content ratings metrics.

42. The network apparatus of claim 41, wherein the media content ratings manager module is further operable to provide media content recommendations to the wireless communication device based on the media content ratings metrics.

43. The network apparatus of claim 41, wherein the media content ratings manager module is further operable to provide advertising to the wireless communication device, wherein the advertising is selected based on the media content ratings metrics.

44. The network apparatus of claim 40, wherein the media content ratings metrics rate said one or more portions of the media content based on the amount of playing of said one or more portions of the media content on the wireless communication device.

45. The network apparatus of claim 40, wherein the media content ratings manager module is further operable to determine advertisement rates for products or services in the media content based on the media content ratings metrics.

46. The network apparatus of claim 40, wherein the media content ratings metrics rate the media content based on at least one of an amount of sharing said one or more portions of the media content with other users, or an amount of transferring said one or more portions of the media content to other devices.

* * * * *